US008571907B2

(12) United States Patent
Jones, Jr.

(10) Patent No.: US 8,571,907 B2
(45) Date of Patent: *Oct. 29, 2013

(54) SYSTEMS AND METHODS FOR WEATHER-BASED ESTIMATION, AUDITING, AND EXCEPTION REPORTING

(75) Inventor: Raymond P. Jones, Jr., Sandy, UT (US)

(73) Assignee: Symbiot Business Group, Inc., Sandy, UT (US)

( * ) Notice: Subject to any disclaimer, the term of this patent is extended or adjusted under 35 U.S.C. 154(b) by 9 days.

This patent is subject to a terminal disclaimer.

(21) Appl. No.: 13/187,352

(22) Filed: Jul. 20, 2011

(65) Prior Publication Data

US 2013/0024333 A1 Jan. 24, 2013

(51) Int. Cl.
G06Q 10/00 (2012.01)
G06Q 30/00 (2012.01)

(52) U.S. Cl.
USPC .................. 705/7.11; 705/7.29; 705/7.31

(58) Field of Classification Search
USPC ....................... 705/7.11, 7.29, 7.31
See application file for complete search history.

(56) References Cited

U.S. PATENT DOCUMENTS

| 5,930,743 | A * | 7/1999 | Warren ................... 702/166 |
| 7,693,623 | B2 * | 4/2010 | Fox et al. .................. 701/19 |
| 2001/0049563 | A1 * | 12/2001 | Addink et al. .................. 700/19 |
| 2003/0023610 | A1 * | 1/2003 | Bove et al. ................ 707/101 |
| 2003/0149607 | A1 | 8/2003 | Ogasawara et al. |
| 2004/0049439 | A1 * | 3/2004 | Johnston et al. ................ 705/34 |
| 2005/0279069 | A1 * | 12/2005 | Novembri et al. ............ 56/13.1 |
| 2007/0192218 | A1 * | 8/2007 | Licardi et al. ................ 705/30 |
| 2007/0277403 | A1 * | 12/2007 | Summer ................... 37/234 |
| 2008/0175356 | A1 * | 7/2008 | Seidberg et al. ................ 379/45 |
| 2010/0057510 | A1 * | 3/2010 | Stevens et al. ................. 705/7 |
| 2011/0106727 | A1 * | 5/2011 | Noyes .................. 705/36 R |

FOREIGN PATENT DOCUMENTS

| CA | 2410194 A1 | 8/2003 |
| JP | 2005290886 | 10/2005 |

OTHER PUBLICATIONS

Baigorria, G.A., W.T. Bowen, and J. Stoorvogel. 2001. Estimating the spatial variability of weather in mountain environments. In: International Potato Center (Ed). Scientist and farmer: partners in research for the 21st century. CIP Program Report 1999-2000. Downloaded Sep. 21, 2012 from cipotato.org/publications/program_reports/99_00/46weather.*

(Continued)

Primary Examiner — Justin M Pats
Assistant Examiner — George H Walker
(74) Attorney, Agent, or Firm — Kirton McConkie; Michael F. Krieger

(57) ABSTRACT

Weather information from one or a variety of locations is used to estimate costs for providing weather-dependent work, to audit weather-dependent work allegedly performed, and to improve billing and provide exception reporting for unbilled weather-dependent work such as snow removal and landscaping. A variety of stand-alone and networked computer systems, sensors, weather information sources, and historical data are used to provide such functions. To estimate costs to perform weather-dependent work at a first location, a weather information source providing weather information relating to a second location estimated to have weather similar to weather occurring at the first location is located, and a correlation is made between the weather information and a history of weather-dependent work at the first location to generate an estimated need for future weather-dependent work at the first location. Current weather information is used to perform auditing of invoiced work and to perform exception reporting.

14 Claims, 4 Drawing Sheets

(56) References Cited

OTHER PUBLICATIONS

Program Evaluation and Audit, Metropolitan Council, Minnisota. "Metro Transit Snow Removal Contracts Review." Jan. 1, 2011. Downloaded Sep. 21, 2012 from http://councilmeetings.metc.state.mn.us/audit/2011/020911/11-A05.pd.*

Arens, Edward A; Flynn, Larry E; Nall, Daniel N; & Ruberg, Kalev. (1980). Geographical extrapolation of typical hourly weather data for energy calculation in buildings. UC Berkeley: Center for the Built Environment. Retrieved from: http://escholarship.org/uc/item/7pc2q3vx.*

John Sonderegger. Technology will play role in St. Peters' snow removal data collection, radar are among methods the city will employ. St.Louis Post—Dispatch. Dec. 17, 1998:1-1.*

Sisiopiku, V.P.; , "Winter road maintenance—ITS options," Intelligent Transportation Systems Proceedings, Aug. 2001 pp. 298-302, doi: 10.1109/ITSC.2001.948672 URL: http://ieeexplore.ieee.org/stamp/stamp.jsp?tp=&arnumber=948672&isnumber=20514.*

Weather Warehouse website Jun. 2010, accessed via http://web.archive.org/.* http://www.smartserviceinfo.com/products/industries/service/snow_removal_service_software.html, accessed Aug. 10, 2011.

http://www.rmtracking.com/blog/2010/02/17/gps-tracking-improves-snow-removal-in-buffalo/, accessed Aug. 10, 2011.

http://plowtrax.home.comcast.net/~plowtrax/docs/PlowTraxHowStormDefsWork.html, accessed Aug. 10, 2011.

* cited by examiner

SYSTEMS AND METHODS FOR WEATHER-BASED ESTIMATION, AUDITING, AND EXCEPTION REPORTING

CROSS-REFERENCE TO RELATED APPLICATIONS

This application is related to co-filed pending patent application Ser. No. 13/187,364, filed Jul. 20, 2011 titled "Systems and Methods for Providing Controls for Aggregated Weather-Based Work," which is incorporated herein in its entirety by reference for all it discloses.

BACKGROUND OF THE INVENTION

1. Field of the Invention

The present invention relates to weather-dependent seasonal work, and more particularly to systems and methods for providing weather-based estimation, auditing, and exception reporting for seasonal work.

2. Background and Related Art

It is known that the weather can have an impact on certain types of seasonal work and personal activities. Some activities and work are affected by the weather, while other activities range from partially to completely weather dependent and may only occur or be needed based on the weather. To date, weather information has largely been used for purposes of preparing for and predicting certain types of activities. For example, snow sports enthusiasts commonly use weather reports to determine when to participate in their winter activities. As another example, workers performing outdoor work often prepare for and plan one or more day's work based on upcoming weather reports. Some outdoor work can be highly dependent on the weather.

Weather-influenced seasonal work includes such work as snow removal from roads, parking lots, and the like and landscaping, including lawn mowing and other care, flower planting, manual watering, and the like. The foregoing are examples of seasonal work that is at least partially weather-influenced. For example, no snow removal is necessary in the absence of snow storms. Similarly, manual watering of existing plants may not be necessary in the event of recent rainstorms. As another example, the need for lawn mowing and other lawn care may be reduced or increased in frequency depending on weather patterns including temperature, rainfall, and other factors.

BRIEF SUMMARY OF THE INVENTION

Implementation of the invention provides various systems, methods, non-transitory computer-readable media storing computer program instructions for causing a computer device to implement methods, and the like to utilize weather information from one or a variety of locations to estimate costs for providing weather-dependent work, to audit weather-dependent work allegedly performed, and to improve billing and provide exception reporting for unbilled weather-dependent work. Implementation of the invention can utilize a variety of stand-alone and networked computer systems, sensors, weather information sources, and historical data to provide such functions.

One exemplary method is provided for estimating costs to perform weather-dependent work at a first location. The estimating method includes locating a first weather information source providing weather information relating to a second location, the second location being estimated to have weather similar to weather occurring at the first location and determining a correlation between the weather information relating to the second location and a need for weather-dependent work at the first location by comparing weather history data relating to the second location from the first weather information source to work history data for weather-dependent work at the first location. The correlation and a history of the weather information relating to the second location are utilized to generate an estimated need for future weather-dependent work at the first location. The estimated need for future weather-dependent work can be used to provide quotes or bids of the cost for services Another exemplary method is provided for auditing invoiced weather-dependent work at a first location. The auditing method may commonly be implemented in conjunction with the method for estimating costs. The method for auditing weather-dependent work includes locating a first weather information source providing weather information relating to a second location, the second location being estimated to have weather similar to weather occurring at the first location and determining a correlation between the weather information relating to the second location and a need for weather-dependent work at the first location by comparing weather history data relating to the second location from the first weather information source to work history data for weather-dependent work at the first location. The correlation and weather data regarding the second location near the time of alleged performance of the weather-related work at the first location is used to evaluate an invoice for weather-dependent work allegedly performed at the first location to determine a likelihood that the weather-related work was necessary and actually performed.

Another exemplary method is provided for improved billing and exception reporting related to weather-dependent work at a first location. The billing and exception reporting method may commonly be implemented in conjunction with the methods for estimating costs and auditing invoiced weather-dependent work. The improved billing method includes locating a first weather information source providing weather information relating to a second location, the second location being estimated to have weather similar to weather occurring at the first location and determining a correlation between the weather information relating to the second location and a need for weather-dependent work at the first location by comparing weather history data relating to the second location from the first weather information source to work history data for weather-dependent work at the first location. The first weather information source is monitored for current weather information related to possible weather-related events suggesting a need for weather-dependent work at the first location, and such events are recorded. A determination is made as to whether an invoice for weather-dependent work at the first location has been received corresponding to all recorded possible weather-related events, and when no invoice for weather-dependent work at the first location has been received corresponding to any one possible weather-related event suggesting a need for weather-dependent work at the first location, a service provider of weather-dependent work at the first location is notified.

Implementation of the invention includes systems to implement methods such as these and variations thereon, including a variety of stand-alone and networked computer systems. The foregoing summarized methods are intended to illustrate features of implementations of the invention, and are not to be deemed limiting of the various implementations of the invention.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
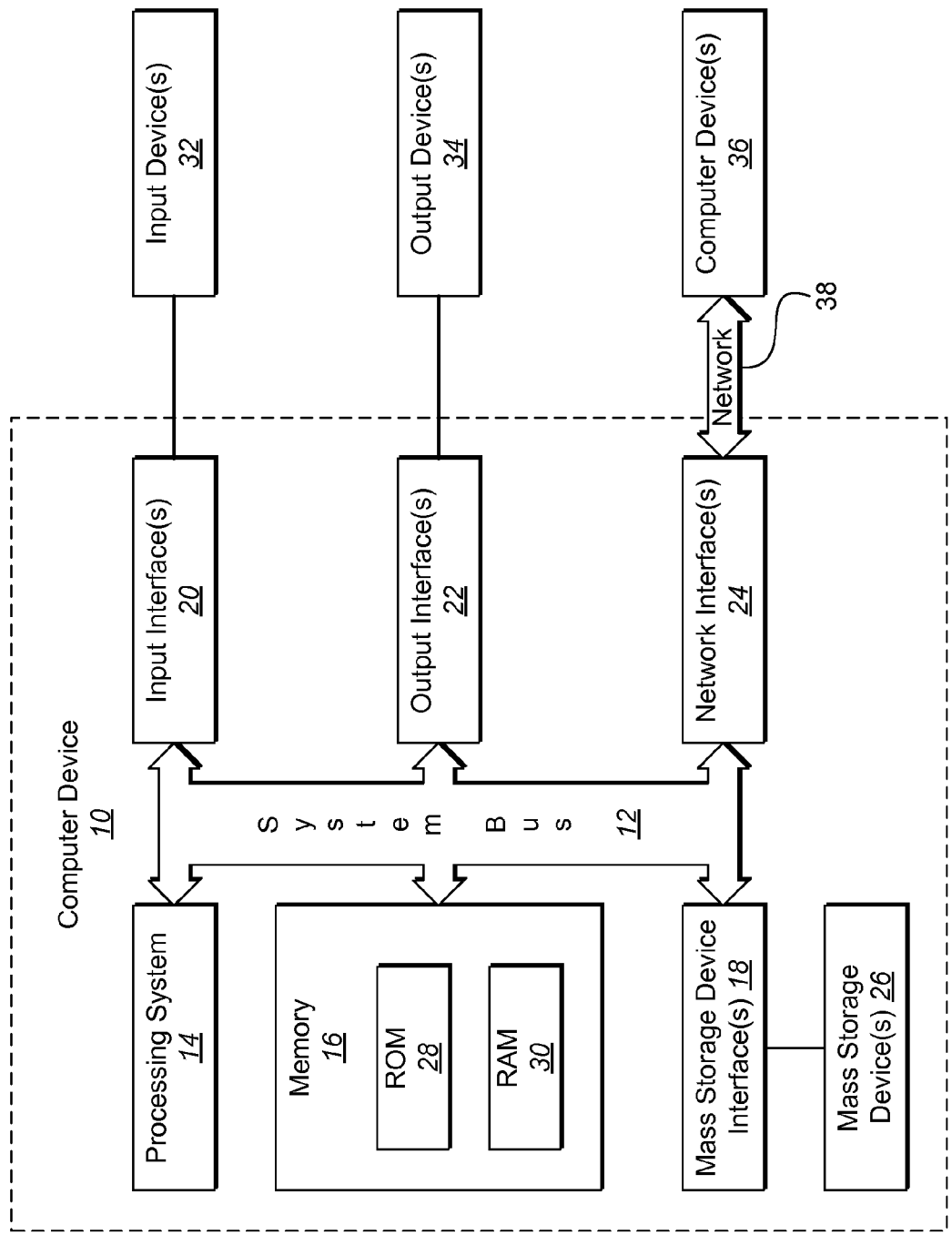
FIG. 1 shows a depiction of a representative computer system that may be used with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide various systems, methods, non-transitory computer-readable media storing computer program instructions for causing a computer device to implement methods, and the like to utilize weather information from one or a variety of locations to estimate costs for providing weather-dependent work, to audit weather-dependent work allegedly performed, and to improve billing and provide exception reporting for unbilled weather-dependent work. Embodiments of the invention can utilize a variety of stand-alone and networked computer systems, sensors, weather information sources, and historical data to provide such functions.

One exemplary method is provided for estimating costs to perform weather-dependent work at a first location. The estimating method includes locating a first weather information source providing weather information relating to a second location, the second location being estimated to have weather similar to weather occurring at the first location and determining a correlation between the weather information relating to the second location and a need for weather-dependent work at the first location by comparing weather history data relating to the second location from the first weather information source to work history data for weather-dependent work at the first location. The correlation and a history of the weather information relating to the second location are utilized to generate an estimated need for future weather-dependent work at the first location. The estimated need for future weather-dependent work can be used to provide quotes or bids of the cost for services Another exemplary method is provided for auditing invoiced weather-dependent work at a first location. The auditing method may commonly be implemented in conjunction with the method for estimating costs. The method for auditing weather-dependent work includes locating a first weather information source providing weather information relating to a second location, the second location being estimated to have weather similar to weather occurring at the first location and determining a correlation between the weather information relating to the second location and a need for weather-dependent work at the first location by comparing weather history data relating to the second location from the first weather information source to work history data for weather-dependent work at the first location. The correlation and weather data regarding the second location near the time of alleged performance of the weather-related work at the first location is used to evaluate an invoice for weather-dependent work allegedly performed at the first location to determine a likelihood that the weather-related work was necessary and actually performed.

Another exemplary method is provided for improved billing and exception reporting related to weather-dependent work at a first location. The billing and exception reporting method may commonly be implemented in conjunction with the methods for estimating costs and auditing invoiced weather-dependent work. The improved billing method includes locating a first weather information source providing weather information relating to a second location, the second location being estimated to have weather similar to weather occurring at the first location and determining a correlation between the weather information relating to the second location and a need for weather-dependent work at the first location by comparing weather history data relating to the second location from the first weather information source to work history data for weather-dependent work at the first location. The first weather information source is monitored for current weather information related to possible weather-related events suggesting a need for weather-dependent work at the first location, and such events are recorded. A determination is made as to whether an invoice for weather-dependent work at the first location has been received corresponding to all recorded possible weather-related events, and when no invoice for weather-dependent work at the first location has been received corresponding to any one possible weather-related event suggesting a need for weather-dependent work at the first location, a service provider of weather-dependent work at the first location is notified.

While the exemplary methods described above are discussed with relation to a single weather information source, embodiments of the invention embrace the use of multiple weather information sources. Where multiple weather information sources are available, a best correlation between the weather information of each weather information source and the work history data may be utilized and the weather information source associated with the best correlation is utilized in generating the estimated need for future weather-dependent work at the first location. Alternatively, a plurality of weather information sources may be used together to provide the estimated need for future weather-dependent work at the first location. Similarly, a best weather information source or a plurality of weather information sources may be used to audit invoiced weather-dependent work and/or to provide exception reporting wherein weather-dependent work is expected but an invoice for such is not received.

FIG. 1 and the corresponding discussion are intended to provide a general description of a suitable operating environment in which certain embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook computer, a netbook, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives, optical disk drives, and flash memory drives. A mass storage device 26 may read from and/or write to a magnetic hard disk, a removable magnetic disk, a magnetic cassette, an optical disk, flash memory, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, touch screen, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
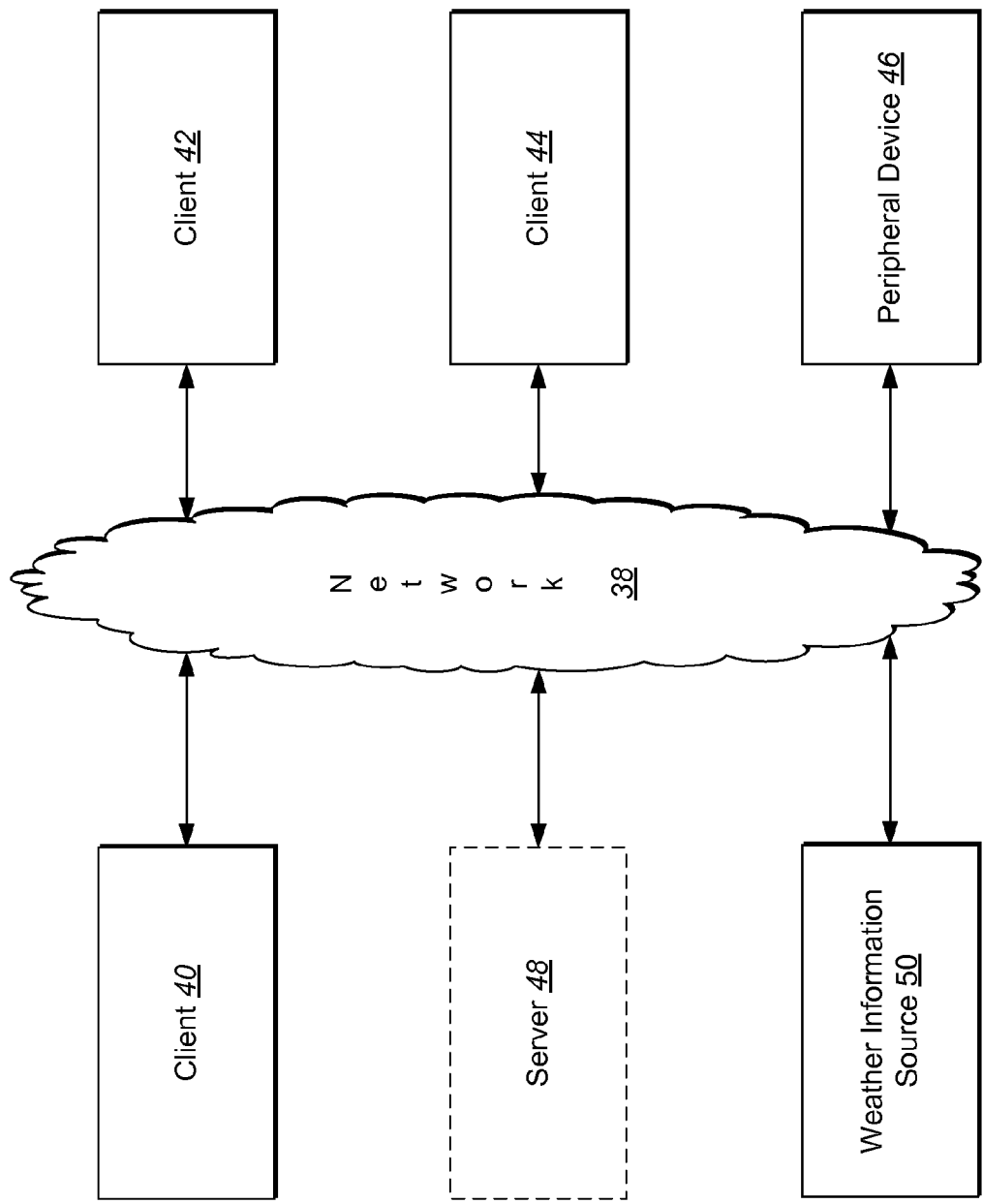
FIG. 2 shows a depiction of a representative networked computer system that may be used with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices (illustrated as multifunctional peripheral (MFP) MFP 46) across network 38. While FIG. 2 illustrates an embodiment that includes a client 40, two additional clients, client 42 and client 44, one peripheral device, MFP 46, and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

As depicted in FIG. 2, one or more weather information sources 50 is connected to the network 38. The weather information source 50 may be any type of weather information source at any level of complexity and providing any of a variety of information types and levels of detail. For example, the weather information source 50 may be or may include a news media source that provides weather information, such as a local or national news source. Alternatively or additionally, the weather information source 50 may be or may include one or more weather sensors or suites of weather sensors that provide particular types of weather information. The weather information source 50 may also be or include local human reports of actual or current weather conditions. The weather information source 50 may also be or include remote sensing data such as satellite data, radar data, and the like for a particular location. The weather information source 50 may be some hybrid of the foregoing potential sources of information, or any other current or future source of weather information.

The weather information source 50, whatever its type, may provide weather information on one of a variety of schedules from real time to near real time to periodically, but preferably provides weather information on a time schedule sufficiently detailed to permit its use for the estimation, auditing, and exception reporting purposes discussed herein. While FIG. 2 shows the weather information source 50 being connected to the network 38, it should be understood that the information provided by the weather information source 50 may be directly available over the network 38 or may be provided to the system in any other applicable fashion, including manual entry at any computer system connected to the network, or through a chain of computer systems (not shown). While one weather information source 50 is shown in FIG. 2, it should be understood that a plurality of weather information sources 50 may be incorporated into the system and it should further be understood that each weather information source 50 may provide weather information about one or more than one geographic locations.

Figure 3:
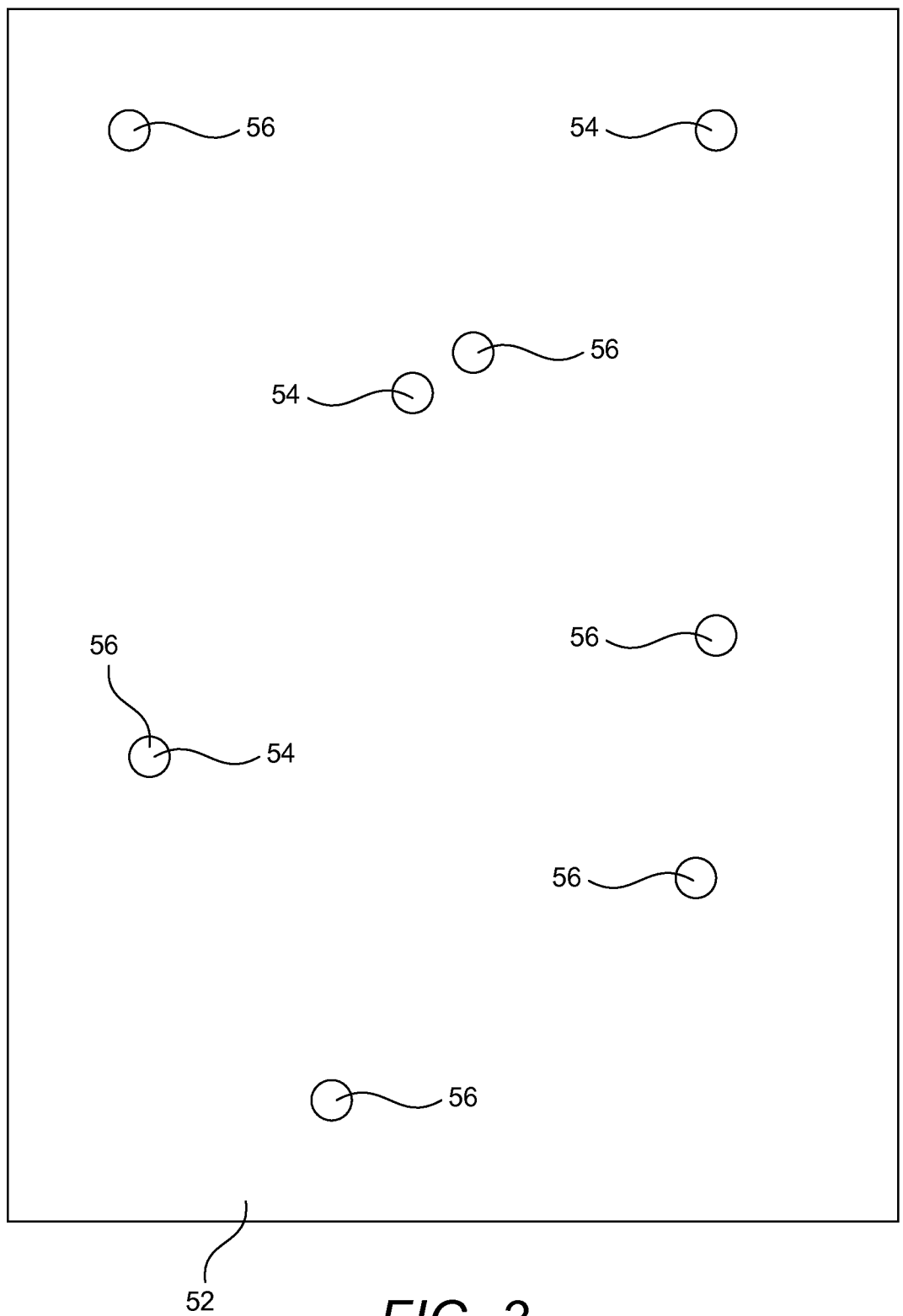
FIG. 3 shows a depiction of locations of weather-dependent work and weather information locations.

FIG. 3 depicts a representative portion of a map 52 of a representative geographic area for purposes of understanding embodiments of the invention. The map 52 of FIG. 3 depicts a variety of locations, each location being represented by a dot or circle. Some of the locations shown on FIG. 3 are work locations 54 and other locations are weather information locations 56. The work locations 54 are or are fairly representative of locations where weather-dependent work will, did, allegedly did, or could potentially occur. The weather information locations 56 are locations where weather information is available from one or more weather information sources 50. As illustrated in FIG. 3, the distance between each of the one or more work locations 54 may vary between the one or more weather information locations 56 by any distance, and indeed, a particular weather information location 56 may be located at or very close to the same location as one of the work locations 54.

Regardless of the proximity of the work locations 54 and the weather information locations 56, at least one of the weather information locations 56 is evaluated to determine a correlation between weather and weather events at a particular work location 54 and weather information provided by a weather information source 50 associated with the weather information location 56. Specifically, a correlation is determined between past weather information provided by the weather information source 50 and weather and weather events at the work location 54 that have resulted in or are correlated with a need to perform weather-dependent work at the work location 54.

As used herein, the term "weather-dependent work" should be understood to relate to any type of work, the need for which is dependent on or influenced by weather. For example, weather-dependent work may include snow removal work. Thus, weather information that is particularly applicable to determining a correlation between weather and weather events at the work location 54 for snow removal purposes may include any type of snowfall information and/or general precipitation and temperature information. In some instances, snow removal may need to be performed multiple times for a single snow event, or several snowfall events may occur in close time proximity, resulting in a need to perform snow removal multiple times in a single day or other time period. Thus, the weather information and information on a past need to perform snow removal at the work location 54 are correlated accordingly.

As another example, weather-dependent work may include landscaping work, such as planting, watering (such as where automatic watering systems are not used), lawn mowing, and the like. In this example, the weather information that may be applicable could be any weather or weather events that affect the need to perform the landscaping work. In some climates and instances, for example, cloudy and rainy weather may reduce the need to perform certain landscaping work or could dictate that such work be performed on a less-frequent time scale while in other climates, such weather may increase the need to perform or needed frequency of certain landscaping work. Thus, the weather information to be correlated with a need to perform weather-dependent work may include a great variety of weather information.

While it may seem that weather information from a weather information source dealing with a particular weather information location 56 located in closest proximity to the work location 54 of interest would always be of most interest, it may be that the correlation between the need for weather-dependent work at the work location 54 and the weather information associated with the weather information location 56 in closest proximity will not be as good as the correlation at a more-distant location. Local climates and weather information can vary greatly from location to location. For example, a first weather information location 56 may be geographically closest to the work location 54, but may be shown to have significantly different weather due to factors such as common prevailing winds, differences in elevation, other geographic features (e.g. proximity to a mountain), differences in local shading, proximity to weather-moderating bodies of water, or any of a variety of other reasons.

Thus, a correlation between weather information from a variety of weather information locations 56 and each work location 54 may be determined. A best fit one or more correlations between past work history at the work location 54 and weather information from one or more weather information locations is then used for purposes of determining what weather information will be used for estimating a future need for weather-dependent work at the work location 54, for auditing weather-dependent work at the work location 54, and for exception reporting with respect to weather-dependent work anticipated to have occurred at the work location 54.

Figure 4:
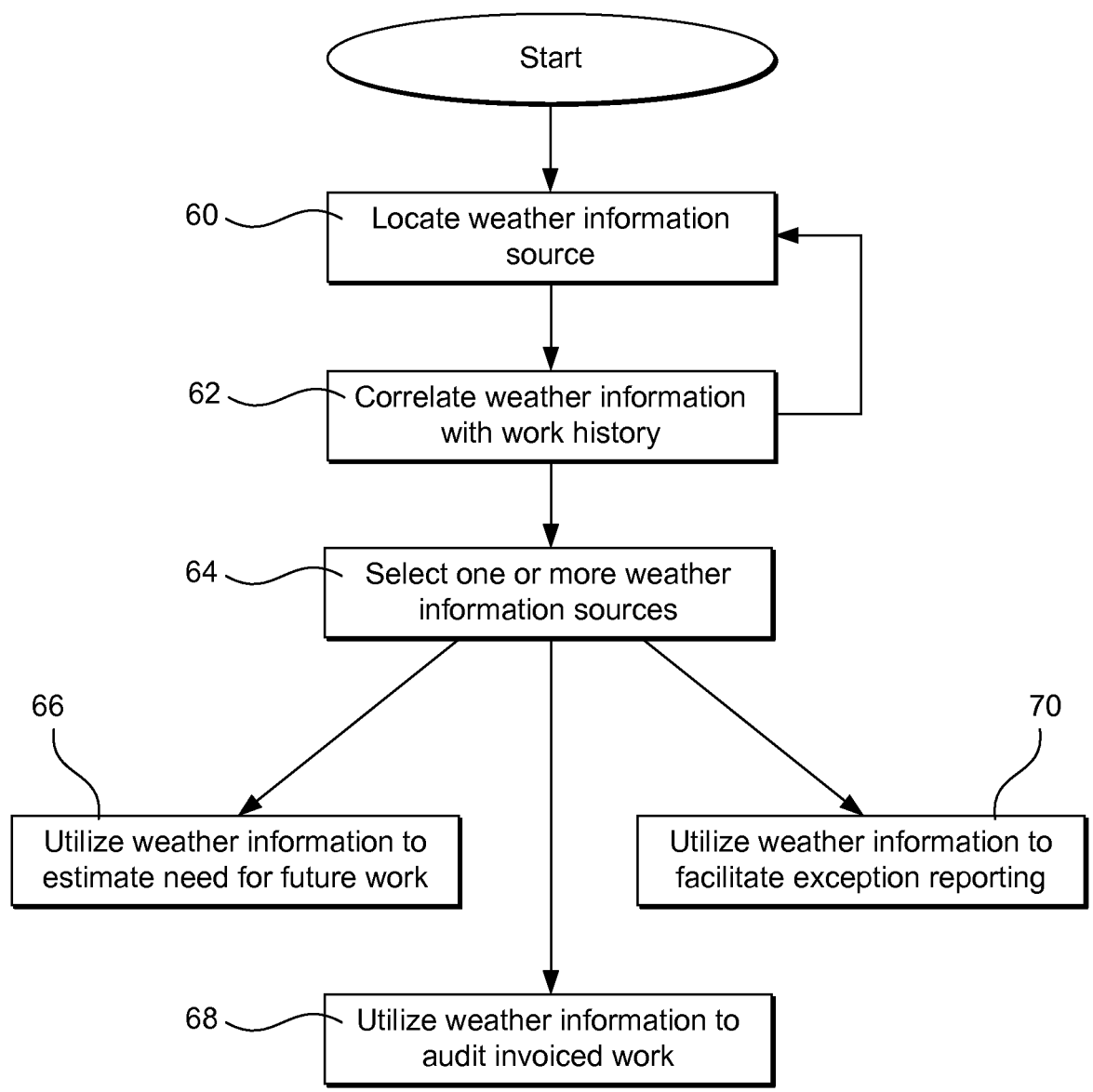
FIG. 4 shows a flowchart illustrating processes in accordance with certain embodiments of the invention.

Thus, FIG. 4 shows steps according to exemplary methods in accordance with embodiments of the invention, beginning with step 60, where a weather information source estimated to be useful for estimating, auditing, and facilitating exception reporting and improved billing is located. Execution proceeds to step 62, where weather information for a particular weather information location 56 is correlated with weather-related work history for a particular work location 54 to generate a determination of how well the weather information and the work history correlate. These steps of locating a weather information source and correlating the weather information and work history can be repeated as needed for as many weather information sources as are available, for as many weather information sources as are estimated to be useful for a particular work location 54, or until a weather information source determined to have sufficient correlation is found.

If no weather information source is found to have a sufficiently-high correlation to be useful for a particular work location, additional efforts to locate alternative weather information sources may be undertaken. Alternatively, information from multiple weather information sources may be combined and a determination made as to whether the use of multiple sources of information may provide sufficient correlation to achieve a desired level of usefulness and/or accuracy. In a worst-case situation, the best available correlation, whether with a single information source or multiple information sources, may be selected for use, at least until additional weather information sources become available or are located. Thus, one or more information sources are selected in step 64.

The selected weather information source or sources is used for estimation purposes at step 66, for auditing purposes at step 68, and for exception reporting and other exception billing purposes at step 70. The weather information may be used for any one or more of these purposes. Past weather information is often used for estimation purposes at step 66, possibly in conjunction with any available long-range forecast information (e.g. whether a particular year is one anticipated to be affected by El Niño or La Niña weather patterns and the like). Current and recent past weather information is often used for auditing and exception reporting/billing purposes at steps 68 and 70.

The weather information is used for estimation purposes at step 66 to provide any type of estimating associated with performing weather-dependent work. For example, an entity wishing to bid on providing snow removal services for a business may wish to have an accurate estimate of the number of times snow removal services should be expected at the location of the business so as to estimate a proper bid or quote for providing the snow removal services. For example, the entity may wish to provide a fixed-estimate or fixed-contract bid for an entire season's worth of snow removal. As is commonly known, providers must provide competitive bids if they wish to obtain a contract, but if their bids fail to accurately estimate the work involved, the providers may incur an operating loss on a contract. Estimating costs based on historical weather information can increase the likelihood that the entity will provide a bid that will reflect anticipated snowfall events.

Even if snow removal services are to be provided on a per-push or per-service basis, the business requesting snow removal services may wish to know how much they should expect to spend for the services for budgeting purposes. In such an instance, the provider can give the business an estimate of the anticipated total cost to plan on for budgeting purposes. Similarly, the service provider or other estimating entity can utilize estimation information to determine whether an adequate workforce is available and/or contracted to provide the necessary anticipated services and can use this information to determine whether to engage additional contractors and/or service providers to assist with existing or anticipated snow removal contracts or, alternatively, whether an existing workforce should be trimmed down. Thus, when snow events happen, the service provider will have an adequate amount of available resources to perform the needed work without having too large an idle workforce.

Similar considerations may be applied to any type of weather-dependent work, including ice removal or mitigation, lawn mowing, watering, landscaping, other lawn care services, or any other type of weather-dependent work. While it will be understood that in any given time period for which an estimation of a need for weather-dependent work is provided, the actual weather relating to the weather-dependent work will vary from any provided estimation, the use of estimations as described herein will provide significant benefits over other estimation methods and systems. Further, to the extent that additional past weather information is accumulated over time, existing estimations may be refined to better reflect long-term averages and weather events.

Oftentimes, a provider of weather-dependent work may utilize contractors and other entities to provide weather-dependent work at certain locations. Similarly, a billing provider may invoice businesses for weather dependent work occurring at a business location. In some instances, the billing services may be provided for a large number of business locations, all to be billed to a single entity. Regardless, current and recent past weather information may be used at steps 68 and 70 to audit invoiced weather-related work that was allegedly performed and to perform exception reporting of non-invoiced weather-related work, such as to facilitate correct billing associated with weather-dependent work.

With respect to auditing invoiced work at step 68, a billing entity may receive an invoice for weather-related work alleged to have been performed by a contractor, worker, or the like. For example, an independent snowplow operator may be assigned to perform snow removal work at a certain location and may provide invoices of work performed from time to time to an overall provider that pays the contractor for the work. The invoice may be provided in any manner, such as paper or electronically, and includes dates and locations for all services provided by the contractor. The date and location information is used to audit the work allegedly performed by the contractor.

For example, an analysis may be performed based on weather-related information associated with the work location 54 for the allegedly-performed work to determine whether it was likely that weather conditions dictated a need for performance of the weather-related work. For example, if weather information indicates that no snow was received during a particular period of time, and an invoice is received for snow removal during that period of time, it is possible that the invoiced snow removal is fraudulent. Alternatively, there may simply be a mistake in the contractor's invoice, such as an incorrect date or location. As another alternative, as weather can sometimes vary even between locations not very distant from one another, it may be that the weather information does not reflect weather actually occurring at the invoiced work location 54.

Regardless, if an analysis of the invoice is indicative of a possibility of a fraudulent or mistaken invoice, a hold may be placed on paying on the potentially-fraudulent or mistaken invoiced work. The hold may remain in place until the contractor has provided adequate assurances or evidence that the work was performed as invoiced. Alternatively, the hold may remain in place until a corrected invoice is submitted, such as with a correct date for the invoiced work. To permit the contractor to respond to the hold, a message informing of the hold may be sent to the contractor. All processes for evaluating and auditing invoices, placing holds, providing notice of holds, and removing holds may be performed automatically in at least some instances, or alerts relating to any such processes may be provided, such as by a computer system display, to a system operator to allow the system operator to accept or reject a hold, or to further evaluate whether a hold is appropriate.

In some instances, an audit of invoiced work may occur in multiple stages. For example, an initial audit may be performed based on weather information from a weather information source deemed to have a best correlation with a particular work location 54. If a potential error is detected based on the initial audit, a further audit may be performed using weather information from additional weather information sources or relating to different weather information locations 56. A further audit of this type may indicate a hold is not necessary if other weather information is indicative that the invoiced work was necessary, likely necessary, or at least potentially necessary. A further audit may detect localized weather patterns as well as situations where weather information from a particular source or relating to a particular weather information location 56 is incorrect or incomplete, such as due to a faulty sensor.

When performing exception reporting at step 70, weather information from a variety of sources may be monitored to detect weather conditions and events indicative of a need to perform weather-dependent work at one or more work locations 54. For example, automatic trigger levels may be set that are indicative of a need to perform weather-dependent work. With respect to snow removal, for example, a reported snowfall amount exceeding two inches may be chosen as a trigger indicative of a need to perform snow removal. Any time a snowfall amount exceeding this trigger level is detected, it may be presumed that weather-dependent work will be necessary at one or more work locations 54.

Exception reporting associated with detected trigger events may occur in a variety of fashions. In one example, contractors assigned to perform weather-dependent work at various locations may check in with the system to indicate that they are aware of a need to perform weather-dependent work and will perform the work. In the case where trigger events are detected and one or more contractors does not check in within a certain amount of time to indicate that the work will be performed, a notification may be sent to the one or more contractors (e.g. by e-mail, telephone call, text message, and the like) requesting that they check in or acknowledge the need to perform weather-dependent work. In the event that certain contractors do not check in, reassignments may be made among other contractors to ensure that all contracted work is performed. Actions such as these may reduce complaints from businesses needing weather-dependent work and ensure that the businesses are well served.

Another type of exception reporting may occur in association with auditing and evaluation of invoiced services. In one example, an invoice may be received that does not include weather-dependent work on a date where a trigger event was detected. When this occurs, a contractor assigned to provide the work can be notified or contacted regarding the potentially-missing work. The contractor may have made a mistake in the invoice that can thus be corrected to ensure proper payment. In addition, a correction can thus be made before work is billed to the end customer, preventing a need for a later corrected invoice in the event the contractor later detects the error. Alternatively, the contractor may simply have discovered that local conditions varied from what was expected based on the weather information, and that weather-dependent work was not necessary. In such an instance, the contractor can indicate that the lack of invoiced work was correct.

Exception reporting may also be performed in instances where no invoice at all is received, even though it is expected that weather-dependent work was necessary and had occurred. A contractor, for example, may find himself occupied with other work and may neglect to provide an invoice for work performed. While the contractor may eventually anticipate invoicing for the work performed, the late invoicing of work performed may appear unprofessional when it results in late billing to the business where the work was performed. Thus, a notification may be provided to the contractor that weather-dependent work was expected on a certain date, that an invoice had not been received, and that an invoice is needed by a certain date or time to facilitate billing.

As may be appreciated, exception reporting in the fashion discussed above may be especially useful at or near the end of billing cycles. Exception reporting methods such as these facilitate timely billing for work performed, and ensures that contractors are timely paid for work they performed.

Embodiments of the invention are implemented with all the functions discussed above in an integrated fashion. Thus, for example, estimates are prepared based on past weather data and weather-dependent work information. Then, once weather-dependent work is undertaken, audits are performed on all invoiced work, and exception reporting occurs to ensure that all expected weather-dependent work is properly invoiced.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A non-transitory computer-readable medium storing computer program instructions for causing a computer device to implement a method for auditing invoiced weather-dependent work at a first location, the method comprising:

locating a first weather information source providing weather information relating to a second location, the second location being estimated to have weather similar to weather occurring at the first location;

determining a correlation between the weather information relating to the second location and a need for weather-dependent work at the first location by comparing weather history data relating to the second location from the first weather information source to work history data for weather-dependent work at the first location; and evaluating an invoice for weather-dependent work invoiced as being performed at the first location in light of weather data regarding the second location near the time of invoiced performance of the weather-related work at the first location to determine a likelihood that the weather-related work was necessary, based on occurrence of a trigger weather event or condition indicative of a need to perform weather-dependent work, and actually performed.

2. A non-transitory computer-readable medium as recited in claim 1, wherein the method further comprises, when an evaluation of the weather-dependent work invoiced as being performed at the first location in light of weather data regarding the second location is indicative that the weather-dependent work was not necessary, placing a hold on paying for the weather-dependent work invoiced as being performed at the first location until a service provider can prove that the weather-dependent work was necessary and was performed.

3. A non-transitory computer-readable medium as recited in claim 1, wherein the method comprises:

locating a plurality of weather information sources providing weather information for at least one of the second location and one or more additional locations; and determining a best correlation between the weather information of each weather information source and the work history data;

wherein weather information having the best correlation is utilized in evaluating invoices for weather-dependent work invoiced as being performed at the first location.

4. A non-transitory computer-readable medium as recited in claim 1, wherein multiple weather information sources are used in evaluating invoices for weather-dependent work invoiced as being performed at the first location.

5. A non-transitory computer-readable medium as recited in claim 1, wherein evaluating invoices for weather-dependent work invoiced as being performed at the first location comprises using the weather data regarding the second location near the time of invoiced performance of the weather-related work at the first location to predict trigger weather events or conditions at the first location that would normally be expected to require weather-dependent work at the first location, the trigger events or conditions being selected from the group of:

snowfall;
rainfall;
sunshine;
wind; and
temperature.

6. A non-transitory computer-readable medium as recited in claim 1, wherein the method further comprises:

when a determination is initially made from the invoice for weather-dependent work invoiced as being performed at the first location that the invoice contains a potential error, conducting an additional audit using weather information relating to information selected from the group consisting of:

additional weather sources; and
additional weather locations.

7. A non-transitory computer-readable medium as recited in claim 6, wherein the method further comprises when the additional audit is indicative that the invoice for weather-dependent work is correct, approving the invoice for weather-dependent work.

8. A non-transitory computer-readable medium storing computer program instructions for causing a computer device to implement a method for auditing invoiced weather-dependent work at a first location, the method comprising:

locating a first weather information source providing weather information relating to a second location, the second location being estimated to have weather similar to weather occurring at the first location;

determining a correlation between the weather information relating to the second location and a need for weather-dependent work at the first location by comparing weather history data relating to the second location from the first weather information source to work history data for weather-dependent work at the first location;

receiving an invoice for weather-dependent work invoiced as being performed at the first location; and evaluating the invoice for weather-dependent work in light of weather data regarding the second location near the time of invoiced performance of the weather-related work at the first location to determine a likelihood that the weather-related work was necessary, based on occurrence of a trigger weather event or condition indicative of a need to perform weather-dependent work, and actually performed.

9. A non-transitory computer-readable medium as recited in claim 8, wherein the method further comprises, when an evaluation of the weather-dependent work in light of weather data regarding the second location is indicative that the weather-dependent work was not necessary, placing a hold on paying for the weather-dependent work invoiced as being performed at the first location until a service provider can prove that the weather-dependent work was necessary and was performed or otherwise corrects the invoice.

10. A non-transitory computer-readable medium as recited in claim 8, wherein the method comprises:

locating a plurality of weather information sources providing weather information for at least one of the second location and one or more additional locations; and determining a best correlation between the weather information of each weather information source and the work history data;

wherein weather information having the best correlation is utilized in evaluating invoices for weather-dependent work invoiced as being performed at the first location.

11. A non-transitory computer-readable medium as recited in claim 8, wherein multiple weather information sources are used in evaluating invoices for weather-dependent work invoiced as being performed at the first location.

12. A non-transitory computer-readable medium as recited in claim 8, wherein evaluating invoices for weather-dependent work invoiced as being performed at the first location comprises using the weather data regarding the second location near the time of invoiced performance of the weather-related work at the first location to predict trigger weather events or conditions at the first location that would normally be expected to require weather-dependent work at the first location, the trigger events or conditions being selected from the group of:

snowfall;
rainfall;

sunshine;
wind; and
temperature.

13. A non-transitory computer-readable medium as recited in claim 8, wherein the method further comprises:
- when a determination is initially made from the invoice for weather-dependent work that the invoice contains a potential error, conducting an additional audit using weather information relating to information selected from the group consisting of:
    - additional weather sources; and
    - additional weather locations.

14. A non-transitory computer-readable medium as recited in claim 13, wherein the method further comprises when the additional audit is indicative that the invoice for weather-dependent work is correct, approving the invoice for weather-dependent work.

* * * * *